(12) United States Patent
Ernst et al.

(10) Patent No.: US 8,593,562 B2
(45) Date of Patent: Nov. 26, 2013

(54) OPTICAL ALIASING FILTER, PIXEL SENSOR ARRANGEMENT AND DIGITAL RECORDING DEVICE

(75) Inventors: Juergen Ernst, Erlangen (DE); Michael Schoeberl, Erlangen (DE); Alexander Oberdoerster, Nuremberg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 401 days.

(21) Appl. No.: 12/896,616

(22) Filed: Oct. 1, 2010

(65) Prior Publication Data
US 2011/0134294 A1   Jun. 9, 2011

Related U.S. Application Data

(60) Provisional application No. 61/248,305, filed on Oct. 2, 2009.

(30) Foreign Application Priority Data

Dec. 23, 2009   (EP) .................................... 09180677

(51) Int. Cl.
*H04N 5/225*   (2006.01)
*G02B 26/08*   (2006.01)
*G02B 5/18*    (2006.01)

(52) U.S. Cl.
USPC ........... 348/342; 348/340; 348/360; 359/569; 359/573; 359/211.6

(58) Field of Classification Search
USPC .......... 348/335, 340, 360, 342; 359/569, 573, 359/574, 885, 204.5, 211.6
See application file for complete search history.

(56) References Cited

U.S. PATENT DOCUMENTS

| | | | |
|---|---|---|---|
| 4,178,611 A | 12/1979 | Okano | |
| 4,878,737 A | 11/1989 | Ise | |
| 4,998,800 A * | 3/1991 | Nishida et al. | 348/342 |
| 5,280,388 A * | 1/1994 | Okayama et al. | 348/342 |
| 5,754,342 A * | 5/1998 | Ohnishi et al. | 359/569 |
| 5,755,501 A * | 5/1998 | Shinohara et al. | 359/558 |
| 6,040,857 A * | 3/2000 | Hirsh et al. | 348/342 |
| 6,326,998 B1 | 12/2001 | Palum | |
| 8,228,418 B2 * | 7/2012 | Pillman et al. | 348/342 |
| 2006/0170797 A1 | 8/2006 | Biernath et al. | |
| 2007/0247733 A1 * | 10/2007 | Shiozawa et al. | 359/885 |

FOREIGN PATENT DOCUMENTS

| | | |
|---|---|---|
| JP | 2009-017406 | 1/2009 |
| JP | 2009-038741 | 2/2009 |

* cited by examiner

*Primary Examiner* — Nhan T Tran
(74) *Attorney, Agent, or Firm* — Micheal A. Glenn; Perkins Coie LLP

(57) ABSTRACT

A refraction at a suitably structured surface for example with an arrangement of the same between image plane and mapping optics is used to realize on the one hand a desired aliasing filtering or spatial low-pass filtering on the image plane wherein on the other hand the manufacturing of such structured surfaces may be realized in a cost-effective way. In addition to that, the plate thickness except for the amplitude of the surface structure and aspects of the stability of the plate is of no importance for handling the same, so that the integration into optical systems is facilitated.

12 Claims, 5 Drawing Sheets

OPTICAL ALIASING FILTER, PIXEL SENSOR ARRANGEMENT AND DIGITAL RECORDING DEVICE

CROSS-REFERENCE TO RELATED APPLICATIONS

This application claims priority from U.S. Patent Application No. 61/248,305 filed 2 Oct. 2009, and European Patent Application No. 09180677.8, filed Dec. 23, 2009, and are incorporated herein in their entirety by reference.

BACKGROUND OF THE INVENTION

The present invention relates to optical aliasing filters, pixel sensor arrangements from a pixel sensor and an optical aliasing filter and pixel recording devices, like e.g. digital cameras.

Image sensors (CCD or CMOS) consist of individual light-sensitive pixels, arranged in a regular grid. The image projected to the sensor is thus divided into image points or pixels. By this sampling of the image in the two-dimensional range, aliasing effects result, when spatial frequencies with more than half the sampling frequency (spatial frequency of the pixels) exist in the image. Half the sampling frequency, as also in telecommunications, is referred to as Nyquist frequency.

In general, the "bandwidth" of the spatial frequencies in the projected image is delimited by mapping characteristics of the lens. In this connection, this is referred to as the modulation transfer function of the lens or objective, in the following referred to as MTF. It is the representation of the transmission function in the frequency range. The corresponding representation of the transmission function in the spatial range is referred to as "point-spread-function", briefly PSF.

With high-quality lenses, the MTF exceeds the Nyquist frequency of the sensor so that more or less strong aliasing effects result. These manifest themselves in the electronic image in the form of moiré-like patterns and colored artifacts.

For a defined limitation of the bandwidth of the spatial frequency in the image, so-called aliasing filters (also optical low pass filters; OLPF) are used. The aliasing filter is inserted between the lens and the sensor in the optical path, i.e. generally in parallel to the sensor surface.

The functional principle of conventional aliasing filters is based on the physical effect of optical birefringence. In detail, one or several plane-parallel plates made of optically active materials are used arranged one after the other and which are generally cemented. As a material often mono-crystalline quartz crystals are used; other materials are also possible. The plates are cut out of the crystal in a certain direction, so that a lightbeam penetrating the plate is split into an ordinary and an extraordinary lightbeam. Both partial beams pass divergently in the medium and are again aligned in parallel by birefringence after exiting the medium. In this way, two partial beams resulted from one beam. The interval between the two partial beams depends on the optical characteristics of the applied material and on the thickness of the plates. As the partial beams are parallel, the effect of the aliasing filter is independent of the location between lens and image plane (sensor area).

If more than one plate is used, and if the further plates are rotated with regard to the orientation of the optical axis by certain angles with regard to the first plate, then the partial beams resulting in the first plate are successively further divided. Here, in general $2^n$ partial beams result, wherein n is the number of plates.

By dividing the original beam into two or several partial beams, for the aliasing filter a transmission function results, which together with the MTF of the lens and the sensor leads to a more or less strong suppression of spatial frequencies above the Nyquist frequency. By a suitable implementation of the aliasing filter, aliasing effects within the image may thus be weakened specifically. Here, however, inevitably, the sharpness in the image is reduced.

In order for the aliasing filter to have a good effect, the bundle of partial beams has to have a diameter which approximately corresponds to the distance of the pixel centers on the sensor. With large pixels, as they are used in high-quality cameras, thus the distance between the partial beams has to be correspondingly large. In this respect, either relatively thick plates of the conventional material quartz are needed or plates made of special materials are used comprising a stronger birefringence. These materials are, however, substantially more expensive than quartz and more difficult to process.

It would be desirable to have a concept for an anti-aliasing filtering which may be integrated into optical systems more easily and with less effort and/or may be realized more cheaply.

Apart from that, realizations of aliasing filters exist, which are based on diffraction, as it is for example described in U.S. Pat. No. 6,040,857, U.S. Pat. No. 6,326,998, U.S. Pat. No. 4,178,611, U.S. Pat. No. 4,998,800 and U.S. Pat. No. 4,878,737, but due to the way of diffraction these solutions lead to a wavelength dependent aliasing or low-pass filtering, which leads to image quality degradation.

SUMMARY

According to an embodiment, an optical aliasing filter formed in the form of a plate with a structured surface having a surface structure may have a spatial frequency spectrum located by more than 85% within a spatial frequency range which is spaced apart from the spatial frequency zero and is positioned so that diffraction effects for light at the surface structure are smaller than refraction effects for light at the surface structure.

According to another embodiment, a pixel sensor arrangement may have a pixel sensor and an optical aliasing filter formed in the form of a plate with a structured surface having a surface structure, having a spatial frequency spectrum located by more than 85% within a spatial frequency range which is spaced apart from the spatial frequency zero and positioned so that diffraction effects for light at the surface structure are smaller than refraction effects for light at the surface structure, wherein the optical aliasing filter is arranged with respect to a light sensitive side of the pixel sensor by spacing apart the structured surface from a light sensitive area of the pixel sensor.

According to another embodiment, a pixel recording device may have a pixel sensor; a mapping optics for a projection onto the pixel sensor, so that at pixels of the pixel sensor converging ray bundles meet; and an optical aliasing filter arranged between the pixel sensor and the mapping optics and formed in the form of a plate with a structured surface, having a surface structure having a spatial frequency spectrum located by more than 85% within a spatial frequency range of a period length of 10 μm up to a period length of two times the sine of half of the image side opening angle of the mapping optics multiplied by a distance between the structured surface and a light sensitive area of the pixel sensor.

According to another embodiment, a method for generating a recording may have the step of projecting an image onto a pixel sensor, so that at the pixels of the pixel sensor converging bundles of rays meet, by arranging an optical aliasing filter between the pixel sensor and the mapping optics used for projection, wherein the optical aliasing filter is formed in the form of a plate having a structured surface having a surface structure having a spatial frequency spectrum located by more than 85% within a spatial frequency range of a period length of 10 μm up to a period length of two times the sine of half of an image-side opening angle of the mapping optics multiplied by a distance between the structured surface and a light-sensitive area of the pixel sensor.

It is the finding of the present invention that by a refraction at a suitably structured surface, for example with an arrangement of the same between image plane and mapping optics on the one hand, the desired aliasing filtering or spatial low-pass filtering may be realized on the image plane, and on the other hand the manufacturing of such structured surfaces may be realized cost-effectively.

In addition to that, the plate thickness, except for the amplitude of the surface structure and aspects of stability of the plate, is of no importance for the handling of the same, so that the integration into optical systems is facilitated.

BRIEF DESCRIPTION OF THE DRAWINGS

In the following, embodiments of the present invention are explained in more detail with reference to the accompanying drawings, in which.

DETAILED DESCRIPTION OF THE INVENTION

Figure 1:
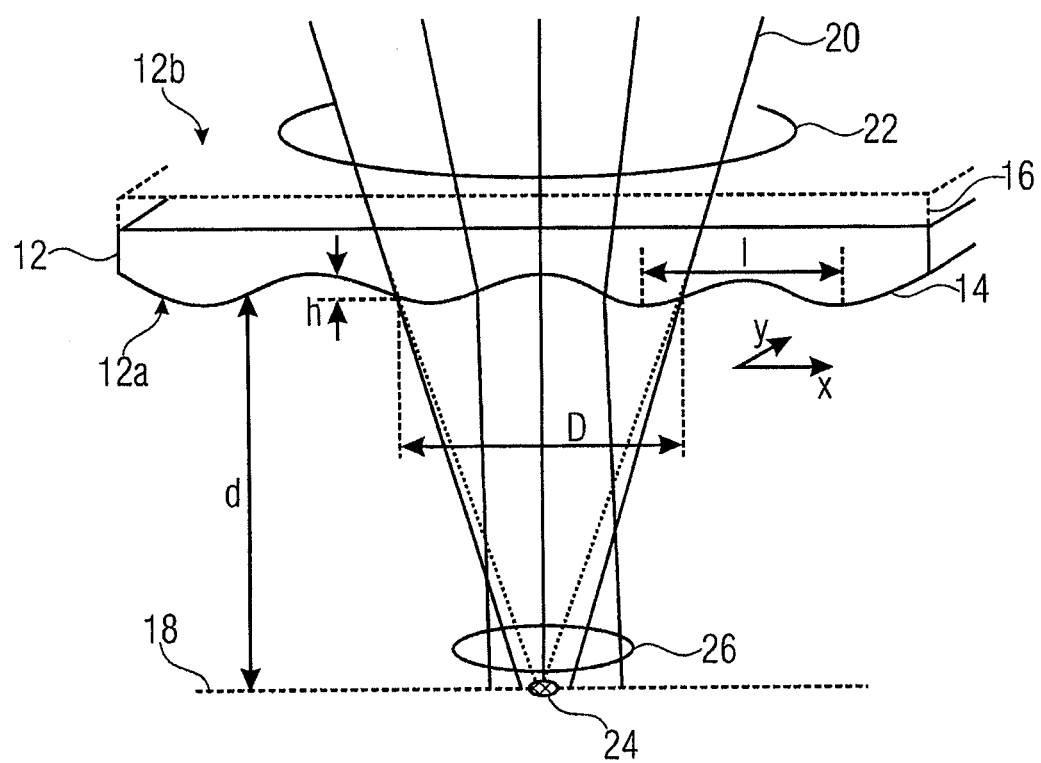
FIG. 1 shows a schematical illustration for showing an optical aliasing filter and its functioning according to one embodiment.

FIG. 1 shows an optical aliasing filter 10 according to one embodiment of the present invention. The optical aliasing filter 10 is formed in the form of a plate 12 of an optically transparent material, like e.g. glass, a curable, transparent material or a thermoplastic transparent material, such as by hot stamping or injection moulding.

The plate 12 comprises main sides 12a and 12b facing away from each other. The main side 12a forms a structured surface 14 with a surface structure having a special form or a special spatial frequency spectrum, which is referred to in more detail in the following, and which is in particular implemented so that the plate 12, when it is arranged between lens and image plane, causes a smudging or expansion of the PSF of the mapping system, so that aliasing effects are reduced. The other main side 12b of the plate may, for example, be implemented plane or level, as it is illustrated in FIG. 1.

The surface structure of the patterned surface 14 is, for example, manufactured by modeling and curing a curable material, whereby the surface structure 14 may be manufactured with a high accuracy and a high reproducibility by a correspondingly accurate molding tool. Other manufacturing methods like hot stamping or others are also possible. The plate 14 does not have to be formed integrally or consist of one single material. Rather, for example, in the case of the use of a molded and cured curable material, the same may be arranged on a transparent substrate 16 or be supported by the same. The presence of a transparent substrate is optional, as indicated by the dashed lines in FIG. 1. Further, the structured surface 14 does not have to be exposed necessarily. It may also be coated, like e.g. by an anti-reflex coating or it may form the interface between two materials, which have a sufficiently high difference regarding their index of refraction.

Details regarding the surface structure of the structured surface 14 are explained in more detail in the following. In any case, the surface is implemented so that more than 85% of its spatial frequency spectrum is combined into a spatial frequency range, which is spaced apart from the spatial frequency 0 and positioned so that diffraction effects for light at the surface structure are less than refraction effects for light at the surface structure. In other words, the surface structure of the structured surface 14 is rounded off or wavy and has no abrupt height changes or edges and corners. This way, there is a high degree of refraction effects. On the other hand, the ripple of the surface structure of the structured surface is not of such a high frequency that substantial diffraction effects would occur. Again, in other words, for example the surface structure of the structured surface 14 is to be implemented so that a cone of light with an opening angle of 45° which passes the structured surface perpendicularly, so that a lateral expansion of the cross-section of the same at the location of the structured surface 14 corresponds to a certain multiple of the mean period length of the structured surface 14, like for example, one, two, three, ten or a hundred times of the same, or a multiple between these values, experiences a widening of the light-spot on the image plane onto which the light bundle is collimated, which is rather determined by the refraction effects at the structured surface 10 than by the diffraction effects at the same.

Further details regarding the implementation of the structured surface 14 and its functioning in anti-aliasing filtering are explained in more detail in the following.

The purpose of the aliasing filter 10, as mentioned above, is the limitation of the high spatial frequencies in the projection of an image onto an area 18, like e.g. the light-sensitive area of a pixel sensor, by the deflection of light beams 20. The deflection of the beams 20 is, as illustrated in FIG. 1, caused by a refraction at the suitably structured surface 14 of plate 12, for example arranged between a lens and an image sensor, comprising the light-sensitive area 18. The plates 12 may be thin, as mentioned above. The minimal thickness should be sufficient, however, to guarantee a sufficient mechanical strength of the plate 12.

The surface structure of the structured surface 14 may be described by a two-dimensional function depending on the location. Likewise, the function may be converted by means of a Fourier transformation into a spectrum of spatial frequencies. Advantageously, the surface structure of the structured surface 14 has a spatial frequency spectrum which remains the same across a certain area. In FIG. 1, the spatial frequency spectrum, for example, remains the same across the complete surface 12a. As also already mentioned, a cross-section of the structure of the structured surface 14 has no peaks or is not triangular or rectangular and does not represent a diffraction grating. The effects of the structured surface 14 rather result from refraction, as indicated in FIG. 1 and explained now with reference to this figure.

Light beams impinging upon the structured surface 14 are not split up in the same way independent of the location which they impinge upon, but are deflected into different directions by refraction at the structured surface 14 depending on the lateral location (x, y). If a plurality of light beams 20 of a light-bundle 22 are considered, which would actually converge at an image point or pixel 24 without structuring of the surface 14, then on average a deflection of the beams 20 into all x/y directions results and thus, consequently an expansion of the light-bundle in the image plane 14, in which the image point 24 is located, or an expansion 26 of the resulting light spot in the plane 18.

In particular, with a converging light-bundle, for example, from an objective or lens which comes together in the image plane 18 in point 24, an expansion of this point 24 results, i.e. a certain unsharpness, which again is the desired effect in aliasing reduction.

As mentioned above, the refraction or deflection depends on the lateral position. Vice versa, the resulting unsharpness should not depend on the position of the light-bundle on the plate or the considered image point on the image plane 18. It is thus advantageous if the diameter or the expansion D of the light-bundle 22 at the height of the structured surface 14 comprises a certain minimum size, which is about as large as the mean period 1 or the structural size of the surface structure of the structured surface 14. Depending on the circumstances, as the minimum size also the period of the lowest-frequency spatial frequency of the surface structure may be used. As the diameter D of the light-bundle is, among others, given by the aperture of the mapping optical system, like e.g. the lens (not shown), in turn the just-mentioned mean period of the surface structure of the structured surface 14 should not exceed a certain maximum value. In particular, 1 should be selected at least smaller than D with a maximum lens aperture, or rather advantageously, for example, smaller than D/2, D/3, D/10 or even D/20. I.e., for the spectrum of the spatial frequencies of the surface structure of the structured surface 14, a certain low-frequency boundary exists.

On the other hand, the occurring spatial frequencies or the structural size of the surface structure of the structured surface 14 should also be limited towards smaller values. The reason for this is the diffraction of light at smaller structures. The diffraction also causes an increase of the focused light-points 24 in the image plane 18, but as the amount of diffraction depends on the wavelength, also the resulting unsharpness would be a function of the wavelength, which is again, not desired.

All in all, the enlargement of the image point 24 results from an overlaying of the two described effects, i.e. a refraction at the structured surface 14 on the one hand, and a diffraction at the surface structure of the structured surface 14 on the other hand. As now, however, the enlargement of the light-point 24 should not or only very little depend on the wavelength, it is advantageous if the diffraction effects are smaller, as compared to the refraction effects, or even step into the background. As the diffraction with smaller structures, i.e. high spatial frequencies of the surface structure of the structured surface 14 becomes stronger, thus, a lower limit for the wavelengths contained in the surface structure 14 exists. In other words, advantageously the spatial frequency spectrum has a high-frequency limit. The same should be selected so that in the complete wavelength range used by the camera, like e.g. the visible range, the deflection of the light beams by diffraction is less than the desired deflection by refraction.

In other words, the spatial frequency spectrum of the surface structure of the structured surface 14 should mainly, like e.g. by more than 85% or even more than 95%, or exclusively lie in an area between the above described low-frequency and high-frequency limit and otherwise only comprise values equal to zero or close to zero. In other words, the integral of the spatial frequency spectrum of low-frequency to high-frequency limit should for example be at least 85%, at least 95% or even approximately 100% of the overall area of the spatial frequency spectrum. This is explained in more detail later with reference to FIG. 2c.

The above-mentioned low-frequency and high-frequency limits may, for example, together determine a spatial frequency range of 100/mm to 1/mm, which again corresponds to a range of period lengths between 10 µm and 1 mm.

Figure 2A:
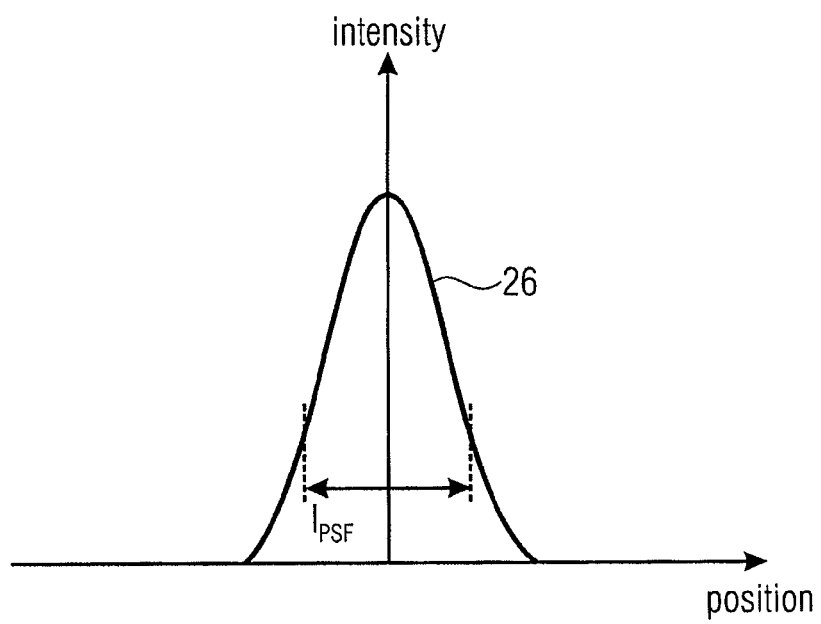
FIG. 2a, b show plots of transmission functions in the spatial area (PSF), i.e. on the one hand as if obtained by a structured surface of an optical aliasing filter according to one embodiment, and as a comparison on the other hand as they are obtained by a surface with abrupt height changes or edges.
Figure 2B:
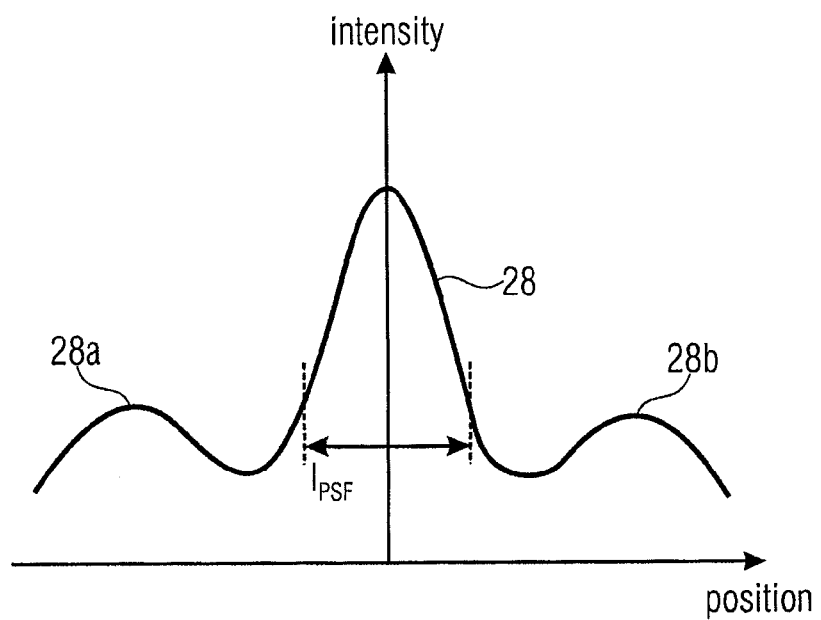
FIG. 2c, d show plots of distributions of wave components of a surface structure plotted across the frequency, i.e. on the one hand of a structured surface of an optical aliasing filter according to one embodiment and, as a comparison that of a surface with abrupt height changes or edges.

For illustration purposes, in FIGS. 2a and 2b the transmission function or the local average value of the PSF of an aliasing filter is illustrated, which according to FIG. 1 mainly realizes the expansion of the light-bundle by a refraction at a correspondingly implemented surface structure with spectral portions mainly in a mean frequency range, as illustrated in FIG. 2a, as compared to the case illustrated in FIG. 2b, where the expansion of the light-bundle is mainly realized by a diffraction at high-frequency portions in the structure. As it is illustrated, one advantage of an aliasing filter according to FIG. 1 further is that its PSF 26 comprises no side maxima, whereas a PSF 28 widened by diffraction comprises side maxima 28a and 28b, which may lead to degraded image detection results when sampling using pixel sensors. Apart from that, as already explained above, the width $1_{PSF}$ of the PSF 28 is in case of diffraction dependent on the wavelength, whereas the $1_{PSF}$ of the PSF 26 in case of refraction is almost independent of the wavelength or only subject to the slight refraction index changes of the material of the plate 12 or the material forming the structured surface 14.

Figure 2C:
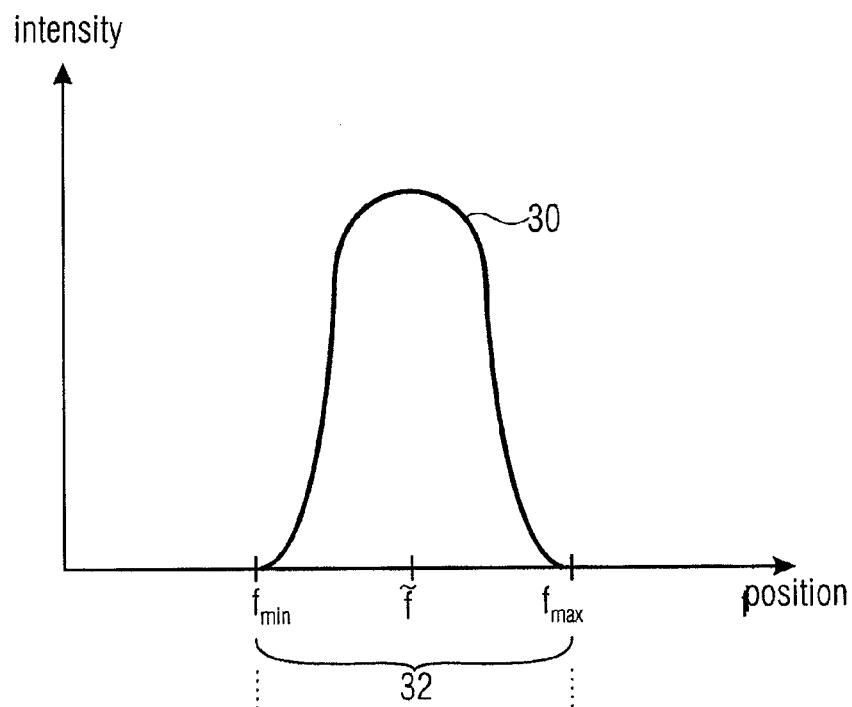
Figure 2D:
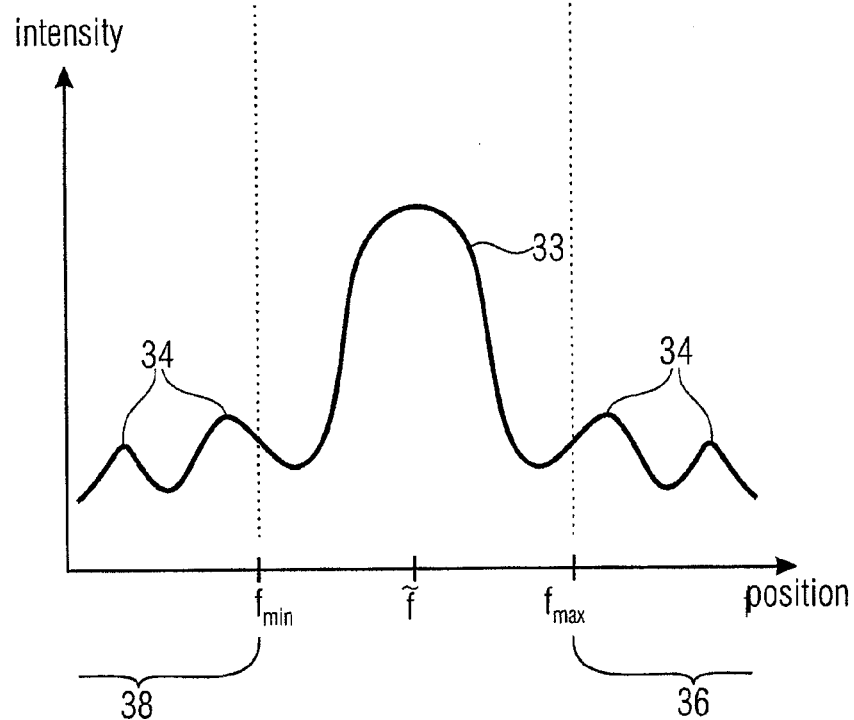

FIGS. 2c and 2d illustrate the difference between the spatial frequency spectrum of an embodiment for a surface structure of the structured surface 14 according to the present invention as compared to the spatial frequency spectrum of an angular surface structure course provided for causing a diffraction. FIG. 2c shows the exemplary spatial frequency spectrum for a surface structure of the structured surface 14, whereas FIG. 2d shows the spatial frequency spectrum of a diffraction surface structure, like e.g. a structure of alternating angular trenches and angular elevations. Both structures have a mean period at the associated spatial frequency $\bar{f}$. The mean period is in the above-mentioned frequency range which is determined by the low-frequency and high-frequency limit, here $f_{max}$ and $f_{min}$. In the example of FIG. 2c, virtually 100% of the spatial frequency spectrum (30) of the surface structure of the structured surface 14 lies within the thus determined frequency range 32. Due to the soft surface structure changes without edges and abrupt height changes of the structured surface 14, the spatial frequency spectrum 30 hardly comprises spectral portions, in the exemplary case of FIG. 2c no spectral portions outside the frequency range 32 and thus in particular also no side maxima. In the case of FIG. 2d, this is different. The surface structure of FIG. 2d, for example, is a diffraction grating. The associated spatial frequency spectrum 33, due to the angular setup in the direction of the grid repetitions, comprises side maxima 34, so that in the case of a spatial frequency spectrum 33 despite the same mean spatial frequency $\bar{f}$, a large portion of the spectrum is outside of the frequency range 32. This again means that the diffraction grating causes a high diffraction in the area 36 above the frequency range 33, although the same average periodicity exists as in the case of FIG. 2c. In the exemplary case of FIG. 2d, thus, a great portion of the spatial frequency spectrum 33 exists at higher frequencies 36, so that the portion of diffraction is large and a further large portion is in a range 38 below the desired frequency range 32, whereby unwanted effects with regard to regularity of the effect of unsharpness are realized, as it was described above.

Of course, a spatial frequency spectrum according to one embodiment of the present invention may also look different to the one which is exemplarily illustrated in FIG. 2, as long as, as mentioned above, only a sufficient part of the range of the spatial frequency spectrum 30 is within the area 32.

The spatial frequency spectrum of the surface structure of the structured surface 14 thus determines the PSF of the plate 12 or the optical aliasing filter 10. As described above, by a suitable shaping of the surface 14, the PSF may be adapted so that aliasing effects become as small as possible and simultaneously the sharpness within the image is as high as possible.

It is possible that the area of the spatial frequency spectrum 30 is not arranged completely, but for example, with more than 85% or even 95% in the spatial frequency range 32 between $f_{max}$ and $f_{min}$. The spatial frequency spectrum 30 may, as described above, comprise an absolute maximum within the spatial frequency range 32 and no side maxima. If side maxima exists, however, it is advantageous for them to lie within the spatial frequency range 32.

Although not mentioned above, it is possible that the spatial frequency spectrum is the same in the x and y direction, i.e. in two orthogonal lateral directions. The opposite is also possible, however. Thus, the spatial frequency spectrum may be different in the two lateral directions in order to achieve certain effects or to be adapted to a corresponding anisotropy of a cooperating pixel array.

It is further noted that, although it is indicated in FIG. 1 that the surface structure of the structured surface 14 is a sine or cosine wave, this is not necessarily the case. A periodic waveform is not inevitable, either. An irregular surface structure is also possible.

As already indicated above, on the surface 14, for preventing light reflections, a de-reflection may be provided. A de-reflection may also be provided on the opposing main side 12b.

If the optical aliasing filter 10 is arranged between a mapping optics like e.g. a lens and the associated image plane, then in principle the exact position of the plate 12 or the structured surface 14 between the same is random. However, the surface structure should be adapted to this position, as mentioned above, as depending on the position, the diameter of the above mentioned light-bundle 22 impinging upon a respective image point 24, i.e. D, is of a different size. For a certain surface structure, a predetermined position of the plate in a certain interval ratio to the image plane on the one side and the mapping optics on the other side is advantageous. It may be the case for practical reasons that it is advantageous to place the plate 12 or the structured surface 14 close to the sensor or close to the image plane 18, respectively. This is advantageous because then the amplitude h of the surface structure of the structured surface 14 is in a range which is advantageous with regard to manufacturing. Further, as it will be shown in the following, the plate 12 may simultaneously serve as a protective lid for the image sensor whose light-sensitive area is in the image plane 18.

It is, for example, advantageous when the following interconnection between the distance d between the image plane 18 and the structured surface 14, the mean period l of the surface structure of the surface 14, the amplitude h of the latter and the pixel center-to-center distance $d_p$ is maintained:

$$0{,}1 \cdot d_p \leq \frac{0{,}7 \cdot h}{l} \cdot d \leq 10 \cdot d_p \quad (1)$$

The amplitude h of the surface structure may, for example, be defined as half of the peak-peak-value of the surface structure or as a different measure of dispersion of the surface contour of the surface 14, for example with regard to a running window, like e.g. be defined as the span, standard deviation, average absolute deviation, interquartile range, etc. In addition, it may be advantageous, if the distance d between the structured surface 14 and the light-sensitive area is in a range between 20 and 200 times a pixel center-to-center distance of the pixel sensor whose light-sensitive area lies in the image plane 18, the spatial frequency range 32 corresponds to a range from 100/mm to 1/mm.

If the parameters are set as in the above inequality, according to one embodiment, a desired unsharpness amplification or aliasing reduction results. Other settings are possible as well.

Figure 3:
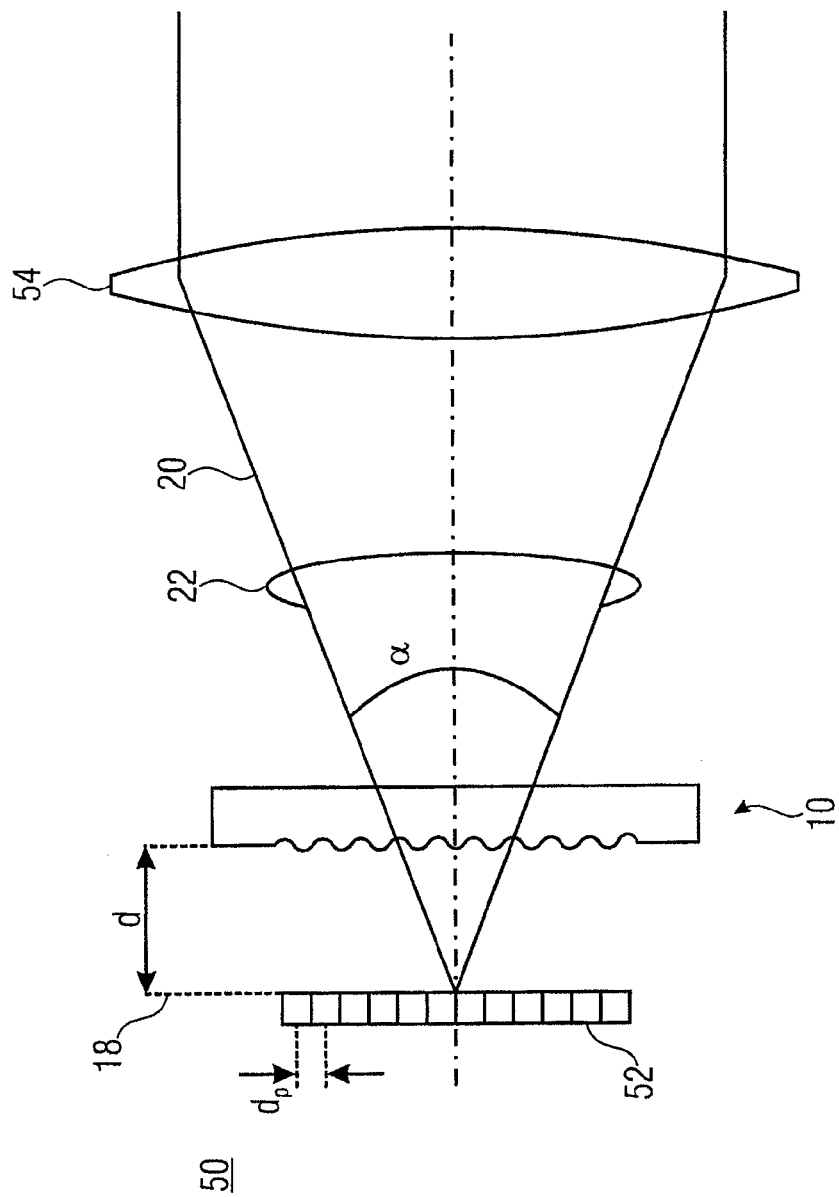
FIG. 3 shows a schematical illustration of a pixel recording device according to one embodiment.

FIG. 3 shows the installation of an optical aliasing filter 10 according to FIG. 1 into a pixel recording device, generally designated by 50. The pixel recording device 50 of FIG. 3, apart from the optical aliasing filter 10, includes a pixel sensor or a pixel array 52 with a certain pixel center-to-center distance $d_p$ and a mapping optics 54, which in case of FIG. 3 is illustrated as a simple converging lens for reasons of simplicity. A light-sensitive area of the pixel sensor 52 is located in the image plane 18 of the mapping optics 52. The optical aliasing filter 10 is arranged in the optical path between the mapping optics 54 and the pixel sensor 52.

The pixel sensor 52 may for example be a CCD or a CMOS sensor. The mapping optics 54 may be a suitable lens, like e.g. a fixed focal length lens or a zoom lens. The pixel sensor 52 may be analog or digital. Accordingly, the pixel recording device 54 may be a digital recording device, like e.g. a digital camera for recording still images and/or moving/video images. Due to the use of the optical aliasing filter 10, the pixel recording device 50, as described above, has reduced aliasing effects. The spatial frequency range 32 of FIGS. 2c and d may, for example, lie from a period length of 10 μm up to a period length two times the sine of half of the image-side opening angle α of the mapping optics 54 multiplied by the distance d between the structured surface and the light-sensitive area of the pixel sensor 52, i.e. 2·sin(α/2).

In some cases it may be advantageous to move the plate of optical aliasing filter of FIG. 1. In this respect, an embodiment is described with respect to FIG. 4. If, for example, for certain reasons, the minimal spatial frequency of the surface structure of the structured surface has to be lower than the value indicated in the description of the figure above, then on the image sensor by an insufficient averaging an inhomogeneity of the intensity of illumination may occur, which overlays on the actual image as an interference. This may be prevented if the place and thus the surface structure move quickly. The speed of the movement has to be so high that within the period of exposure of an image the inhomogeneities of the illumination strength are averaged at every point of the image. The movement is only lateral and may, for example, include a rotation and/or translation.

The movement of the plate 12 may, for example, be executed by a rotating or oscillating movement in the plane of the plate 12, in the following referred to as x-y plane. The movement may be executed in one direction only, like e.g. x, or simultaneously in two directions (x and y). The oscillating movement may be executed in different directions with a different amplitude and a different frequency. The distance of the plate to the sensor here does not change substantially. The movement of the plate may be caused by suitable mechanical actuators, like e.g. piezo- or magnet-based actuators. By a corresponding application of powers to the plate 12, by means of one single actuator, an oscillating movement in both directions of the plate plane may be generated. Also, several actuators may be used, however.

The plate is suspended elastically, so that it may move in the x/y plane, while it is limited regarding movement or unmovable in the z-direction. The stiffness of the suspension may, for example, be substantially higher in the z-direction, i.e. in the direction normal to the surface of the surface 14 than in the x-y plane.

Figure 4:
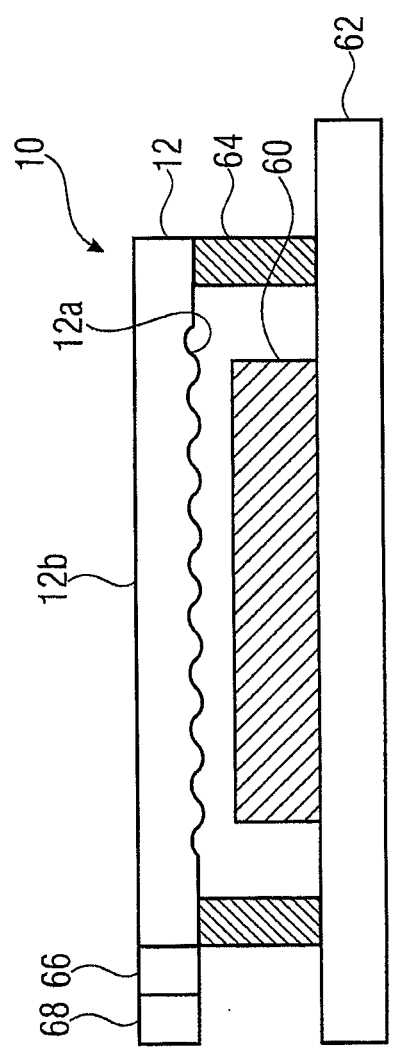
FIG. 4 shows a schematical illustration of a pixel sensor arrangement according to one embodiment.

In the embodiment of FIG. 4, which is described now, the plate 12 serves apart from its optical function as an optical aliasing filter further as a protective lid of a housing for encapsulating a pixel or image sensor and/or pixel array 60. The plate 12 is elastically suspended. In the example of FIG. 4, the image sensor 60 is arranged hermetically sealed in a housing formed by a carrier plate 62 on which the image sensor is arranged, the protective lid in form of the plate 12 and the sidewalls 64. In the exemplary embodiment of FIG. 4, the sidewalls or the circumferential wall 64 are formed of an elastic material and thus form the elastic suspension of the optical aliasing filter 10 or the plate 12. The elastic material allows bending motions as a consequence of a lateral oscillation of the plate 12 and thus causes a suspension of the plate 12 allowing a lateral oscillation of the plate 12. With a movement of the plate 12 in a direction normal to the surface or a thickness direction, the elastic material 64 is squeezed or expanded, at a clearly increased stiffness, however, than in the case of a bending of the lateral movement of the plate 12.

In the case of FIG. 4, thus the elastic suspension 64 is part of the sensor housing in which the image sensor 60 is arranged sealed hermetically, whereby the image sensor 60 is completely sealed among others by the plate 12 with respect to the environment.

The elastic range of motion of the plate 12 may be limited mechanically by suitable measures, wherein no examples are shown in FIG. 4, however, for reasons of clarity. Possibilities for this would be mechanically fixed stops, limiting the degrees of freedom of motion or the deflection possibilities of the plate 12. This way, the elastic suspension 64, under the effect of external powers onto the plate 12, is not overloaded. External powers may, for example, occur when cleaning the plate surface 12b to be directed to the lens.

In FIG. 4, an actuator is exemplarily designated by 66. The actuator is, for example, connected to the plate 12, so that the actuator 66 exerts a power in the lateral direction onto the plate 12 and, in the opposite direction, exerts the same power to a free mass 68, whereby all in all by the elastic material 64, the mass 68 and the plate 12 a spring/mass system is formed, having a resonant frequency, wherein the drive 66 is operated at the resonant frequency or close to the same.

The driving power put into the motion of the plate 12 by the actuator 66 is mainly converted into heat by losses in the elastic suspension 64. In order to reduce the driving power, the losses in the elastic suspension 64 ought to be reduced, which may, for example, be achieved by reducing the spring constant of the elastic suspension 64. By this, however, also the resonant frequency of the spring/mass system becomes lower. To obtain a higher natural frequency anyway, at the plate 12, additional mechanical spring/mass systems may be attached which form a double or multi-resonator together with the plate. The drive of the plate 12 may also be realized in a different way. Further, the frequency of the excitation may substantially deviate from the resonant frequency. The excitation may take place with a certain frequency or also with the overlaying of different frequencies and respectively different amplitudes.

FIG. 4 thus forms a pixel sensor arrangement with the pixel sensor 60 and the optical aliasing filter 10. The double usage of the plate 12 as an optical aliasing filter and a protective lid of the housing of the pixel sensor 60 is optional. Likewise, the elastic suspension may be realized differently or exist in addition to a possible housing of the image sensor. In addition to this, in the preceding embodiments, the structured surface 14 was illustrated as a surface facing the image sensor. Arranging the plate the other way around in the optical path would also be possible, however.

The embodiments described above thus enable an anti-aliasing filtering in an extremely inexpensive and effective way and with a sufficient quality. In particular, the above embodiments may also be used with restricted space conditions which prevent the use of conventional aliasing filters made of quartz. Apart from that, the above embodiments enable a parameterability of the PSF of the aliasing filter by a corresponding surface shape, as the PSF may be largely influenced by corresponding surface moulding.

Thus, thick plates have the disadvantage that they influence the optical path between the lens and the image sensor by elongating the optical path. This leads to the fact that mapping characteristics of the lens in combination with the plate (aliasing filter) are degraded. This statement does not relate to the deliberately reduced MTR, but to mapping errors like spherical or chromatical aberrations, image filed curvature and others. Further, thick plates have the disadvantage that due to constructive circumstances of camera housing and the lens, in some cases they do not fit into the free space between lens and image sensor. According to the above embodiments, the plate thickness may be kept thin, which is why the above disadvantages might be avoided. Plates of special materials with an especially high refraction index are not needed either. The sharpness in the image is reduced by the low pass effect of the aliasing filter, i.e. the more the strongly the more the aliasing effects are suppressed. In order to achieve an optimal compromise between the suppression of aliasing effects and resulting unsharpness in the image, the default of a virtually random PSF is needed, which is possible in the above embodiments.

The above embodiments may thus, for example, be used in electronic cameras having an image sensor whose light-sensitive area is set up from individual pixels. The sensor may, as mentioned above, for example, be a CCD or CMOS sensor.

According to one embodiment, thus an optical aliasing filter which may also be referred to as an anti-aliasing filter is formed in the form of a plate having a structured surface with a surface structure comprising a spatial frequency spectrum with significant portions greater than zero in a "middle" area between a lower and an upper frequency limit, so that diffraction effects for light at the surface structure are smaller than refraction effects for light at the same. The spatial frequency spectrum is in a range of 100/mm to 1/mm; the periods thus lie in a range of 10 µm to 1 mm.

According to a further embodiment, a digital recording device includes a digital camera or a pixel sensor having a predetermined pixel center-to-center distance, a collimating optics, like e.g. a lens, for a projection onto the pixel sensor, so that at the pixels of the image sensor converging pencils of rays meet, and an optical aliasing filter arranged between the image sensor and the collimating optics and formed in the form of a plate with a structured surface. The surface structure may comprise a spatial frequency spectrum with significant portions greater than zero in a "middle" range between a lower and an upper frequency limit, wherein diffraction effects for the bundle of rays at the surface structure are smaller than refraction effects. The spatial frequency spectrum is in a range from 100/mm to 1/mm; the periods thus lie in a range from 10 μm to 1 mm.

The aliasing filter is closer to the sensor than to the lens, advantageously the distance of the structured surface to the sensor surface is in a range of 20 times to 200 times the center-to-center distance.

In other words, again, according to one embodiment, an optical aliasing filter, also referred to as anti-aliasing filter, may be formed in the form of a plate having a structured surface with a surface structure comprising a spatial frequency spectrum with a peak in a frequency range in which diffraction effects for light at the surface structure are smaller than refraction effects for light at the same, and which is below, for example, 1 mm$^{-1}$ or alternatively ¼ mm$^{-1}$. And according to again another embodiment, a digital recording device or digital camera may comprise a pixel sensor with a predetermined pixel center-to-center distance, a collimating optics, like e.g. an lens, for a projection onto the pixel sensor, so that at pixels of the pixel sensor converging bundles of rays meet, and an optical aliasing filter arranged between the pixel sensor and the collimating optics and formed in the form of a plate having a structured surface. The surface structure may comprise a spatial frequency spectrum with a peak in a frequency range, wherein diffraction effects for the bundle of rays at the surface structure are smaller than refraction effects, and whose corresponding period is below, for example, ½ or alternatively ¼ or in the range of 1.1 times to 10 times a mean lateral expansion of the converging bundle of rays in the structured surface. Apart from this, the transparence of the aliasing filter may, for example, be limited to visible, IR or UV light or a combination of the same. Alternatively, a transparent area would also be possible, however. Refraction index relations mentioned above may, for example, be related to the mean wavelength of the transparent range.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A pixel recording device, comprising:
   a pixel sensor;
   a mapping optics for a projection onto the pixel sensor, so that at pixels of the pixel sensor converging ray bundles meet; and
   an optical aliasing filter arranged between the pixel sensor and the mapping optics and formed in the form of a plate with a structured surface, comprising a surface structure comprising a spatial frequency spectrum located by more than 85% within a spatial frequency range of a period length of 10 μm up to a period length of two times the sine of half of the image side opening angle of the mapping optics multiplied by a distance d between the structured surface and a light sensitive area of the pixel sensor.

2. The pixel recording device according to claim 1, wherein the spatial frequency range is between 100/mm to 1/mm.

3. The pixel recording device according to claim 1, wherein the optical aliasing filter comprises a curable transparent material, thermoplastic transparent material or glass molded and cured according to the surface structure.

4. The pixel recording device according to claim 1, wherein the plate is suspended vibratably in the lateral direction.

5. The pixel recording device according to claim 1, further comprising a drive to laterally move the plate.

6. The pixel recording device according to claim 1, wherein the spatial frequency spectrum is arranged within the spatial frequency range by more than 95%.

7. The pixel recording device according to claim 1, wherein the spatial frequency spectrum comprises an absolute maximum within the spatial frequency range and comprises no side maxima or comprises side maxima lying within the range.

8. The pixel recording device according to claim 1, wherein a side of the plate facing away from the structured surface is plane.

9. The pixel recording device according to claim 8, wherein the structured surface is coated or forms the interface between two materials having a different index of refraction.

10. The pixel recording device according to claim 1, wherein the distance d between the structured surface and the light sensitive area lies within a range between 20 to 200 times the pixel center-to-center distance.

11. The pixel recording device according to claim 1, wherein the following connection between the distance d between a light sensitive area of the pixel sensor and the structured surface, a mean period l of the surface structure of the structured surface, the amplitude h of the surface structure of the structured surface and the pixel center-to-center distance $d_p$ exists:

$$0,1 \cdot d_p \leq \frac{0,7 \cdot h}{l} \cdot d \leq 10 \cdot d_p.$$

12. A method for generating a recording, comprising
projecting an image onto a pixel sensor, so that at the pixels of the pixel sensor converging bundles of rays meet, by arranging an optical aliasing filter between the pixel sensor and a mapping optics used for projection, wherein the optical aliasing filter is formed in the form of a plate having a structured surface comprising a surface structure comprising a spatial frequency spectrum located by more than 85% within a spatial frequency range of a period length of 10 μm up to a period length of two times the sine of half of an image-side opening angle of the mapping optics multiplied by a distance between the structured surface and a light-sensitive area of the pixel sensor.

* * * * *